United States Patent
Le-Ngoc

(10) Patent No.: US 10,284,267 B2
(45) Date of Patent: May 7, 2019

(54) SYSTEM AND METHOD FOR REDUCING SELF-INTERFERENCE IN A WIRELESS RESOURCE

(71) Applicant: Tho Le-Ngoc, Montreal (CA)

(72) Inventor: Tho Le-Ngoc, Montreal (CA)

(73) Assignee: HUAWEI TECHNOLOGIES CANADA CO., LTD., Kanata (CA)

(*) Notice: Subject to any disclaimer, the term of this patent is extended or adjusted under 35 U.S.C. 154(b) by 0 days.

(21) Appl. No.: 15/067,647

(22) Filed: Mar. 11, 2016

(65) Prior Publication Data
US 2017/0264347 A1 Sep. 14, 2017

(51) Int. Cl.
| H04B 7/04 | (2017.01) |
| H04B 7/0456 | (2017.01) |
| H04B 7/06 | (2006.01) |
| H04B 15/02 | (2006.01) |
| H04B 7/0413 | (2017.01) |
| H04B 7/10 | (2017.01) |

(52) U.S. Cl.
CPC ......... H04B 7/0456 (2013.01); H04B 7/0413 (2013.01); H04B 7/0626 (2013.01); H04B 15/02 (2013.01); H04B 7/10 (2013.01)

(58) Field of Classification Search
CPC ...... H04B 7/456; H04B 7/0626; H04B 15/02; H04B 7/0413
See application file for complete search history.

(56) References Cited

U.S. PATENT DOCUMENTS

| 7,299,027 B2 | 11/2007 | Sudo |
| 9,319,252 B2* | 4/2016 | Li ..................... H04L 25/03343 |
| 2002/0085643 A1* | 7/2002 | Kitchener ............ H04B 7/0417 375/267 |
| 2003/0095067 A1 | 5/2003 | Howell |
| 2007/0035442 A1 | 2/2007 | Manasson et al. |
| 2008/0091389 A1 | 4/2008 | Kim et al. |
| 2008/0130805 A1* | 6/2008 | Wang ................... H04B 7/0837 375/350 |
| 2009/0096857 A1 | 4/2009 | Frisco et al. |
| 2010/0162075 A1* | 6/2010 | Brannstrom ........... H03M 13/11 714/752 |
| 2010/0231452 A1 | 9/2010 | Babakhani et al. |

(Continued)

FOREIGN PATENT DOCUMENTS

WO WO2015149312 A1 10/2015

*Primary Examiner* — Sophia Vlahos

(57) ABSTRACT

A method for two stage communication is provided together with an apparatus for performing the method. The method receives channel state information (CSI) for a wireless resource. The CSI is processed to identify first and second time-varying characteristics of a wireless resource. First and second transmit matrices are configured based on the first and second time-varying characteristics, respectively. A signal for transmission by a plurality of transmit antenna elements is then generated by applying the first and second transmit matrices to symbols of a data stream for transmission. Optionally, first and second receive matrices are also generated for processing signals received from a plurality of receive antenna elements. In some cases, the method may mitigate self-interference between transmitted and received signals on the wireless resource.

20 Claims, 4 Drawing Sheets

(56) References Cited

U.S. PATENT DOCUMENTS

| | | | |
|---|---|---|---|
| 2010/0232525 A1* | 9/2010 | Xia | H04B 7/0626 375/259 |
| 2011/0208481 A1 | 8/2011 | Slastion | |
| 2012/0146869 A1 | 6/2012 | Cheung et al. | |
| 2012/0250541 A1* | 10/2012 | Ko | H04L 1/0026 370/252 |
| 2012/0288022 A1* | 11/2012 | Guey | H04B 7/0691 375/267 |
| 2013/0028341 A1* | 1/2013 | Ayach | H04B 7/0478 375/267 |
| 2013/0039445 A1* | 2/2013 | Hwang | H04B 7/0617 375/316 |
| 2013/0163544 A1 | 6/2013 | Lee et al. | |
| 2013/0258972 A1* | 10/2013 | Kim | H04B 7/0617 370/329 |
| 2013/0329820 A1* | 12/2013 | Harel | H04B 7/0456 375/267 |
| 2014/0341312 A1 | 11/2014 | Lee et al. | |
| 2015/0092621 A1 | 4/2015 | Jalloul et al. | |
| 2015/0103934 A1* | 4/2015 | Nam | H04B 7/0413 375/260 |
| 2015/0244436 A1 | 8/2015 | Le-Ngoc et al. | |
| 2016/0353294 A1 | 12/2016 | Wang et al. | |

\* cited by examiner

SYSTEM AND METHOD FOR REDUCING SELF-INTERFERENCE IN A WIRELESS RESOURCE

FIELD

The present application relates generally to wireless communication, and in some aspects, to communication for multiple-input and multiple-output (MIMO) systems.

BACKGROUND

Some communication systems make use of multiple antenna elements at the transmitter and/or the receiver. For example, MIMO systems involve communication between a transmitter with multiple antenna elements and a receiver with multiple antenna elements. MIMO systems may offer spatial multiplexing, diversity, and beamforming gains compared to systems with a single antenna element at the transmitter and the receiver.

In massive MIMO communication systems, base stations may make use of arrays of antenna elements. The number of antenna elements is larger than a number of parallel streams being transmitted. For example, a multi-user (MU) massive MIMO system may have a base station with hundreds or even thousands of antenna elements simultaneously serving tens of users on a same time-frequency wireless resource.

Massive MIMO may increase the capacity and radiated energy-efficiency of a communications system. The capacity increase may result from aggressive spatial multiplexing. The energy-efficiency increase may result from coherent superposition of wave-fronts emitted by the large number of antennas to focus energy into small regions of space. By shaping the signals transmitted by the large number of antennas, a base station may aim to have wave-fronts collectively emitted by the antennas to add up constructively at the locations of intended receiver terminals, and destructively (or randomly) in other locations.

In some cases, the spectral efficiency of a massive MIMO system can be increased if the antenna elements and the transceiver at a base station allow full-duplex communication. Full-duplex communication involves simultaneous transmission and reception over a same wireless resource.

The channel quality of a wireless resource may vary over time. In full-duplex communication systems, self-interference between signals transmitted by a base station and signals received by the base station may negatively affect the channel quality of the wireless resource.

SUMMARY

In one aspect, there is provided a method including receiving channel state information (CSI) for a wireless resource, processing the CSI to identify at least one first time-varying characteristic and at least one second time-varying characteristic of the wireless resource, configuring a first transmit matrix based on the first time-varying characteristics, configuring a second transmit matrix based on the second time-varying characteristics, generating a signal by applying the first transmit matrix and the second transmit matrix to symbols of a data stream for transmission, and transmitting the signal from a plurality of transmit antenna elements.

Optionally, processing the CSI includes processing the CSI to extract, as the first time-varying characteristics, channel quality characteristics of the wireless resource that vary more quickly than other channel quality characteristics of the wireless resource. Processing the CSI also includes processing the CSI to extract, as the second time-varying characteristics, channel quality characteristics of the wireless resource that vary less quickly than the first time-varying characteristics.

Optionally, the first transmit matrix is a first baseband digital precoding matrix.

Optionally, the second transmit matrix is a first analog beamforming matrix.

Optionally, the method also includes configuring a first receive matrix for analog beamforming, configuring a second receive matrix for at least one of baseband digital equalization or combining, receiving a signal from a plurality of receive antenna elements, and generating a received data stream by applying the first receive matrix and the second receive matrix to the received signal.

Optionally, configuring the second transmit matrix and configuring the first receive matrix includes selecting the second transmit matrix and the first receive matrix such that the product of the first receive matrix, a self-interference term, and the second transmit matrix is minimized. The self-interference term represents self-interference in the received signal resulting from transmitting the transmitted signal.

Optionally, processing the CSI includes performing a filtering operation to extract the time-varying characteristics of the wireless resource that vary more quickly than the other time-varying characteristics of the wireless resource.

Optionally, identifying the first time-varying characteristics and the second time-varying characteristics of the wireless resource includes partitioning time-varying characteristics of the wireless resource into the identified first time-varying characteristics and the identified second time-varying characteristics.

In another aspect, there is provided an apparatus including a plurality of transmit antenna elements, a controller for processing channel state information (CSI) for a wireless resource by identifying first time-varying characteristics and second time-varying characteristics of the wireless resource, a first digital processing unit configured with a first transmit matrix by the controller based on the first time-varying characteristics, a first analog processing unit configured with a second transmit matrix by the controller based on the second time-varying characteristics, and a transmit signal path including the first digital processing unit and the first analog processing unit. Input to the transmit signal path includes a transmit data stream, and output from the transmit signal path includes a signal for transmission by the plurality of transmit antenna elements.

Optionally, the identified first time-varying characteristics consist of time-varying characteristics of the wireless resource that vary more quickly than the identified second time-varying characteristics of the wireless resource.

Optionally, the first transmit matrix is a first baseband digital preceding matrix, and the second transmit matrix is a first analog beamforming matrix.

Optionally, the apparatus also includes a plurality of receive antenna elements, a second analog processing unit configured with a first receive matrix by the controller for analog beamforming, a second digital processing unit configured with a second receive matrix by the controller for at least one of baseband digital equalization or combining, and a receive signal path including the second analog processing unit and the second digital processing unit. Input to the receive signal path includes a signal received by the plurality of receive antenna elements, and output from the receive signal path includes a receive data stream.

Optionally, the second transmit matrix and the first receive matrix have been selected by the controller such that the product of the first receive matrix, a self-interference term, and the second transmit matrix is minimized. The self-interference term represents self-interference in the signal received by the plurality of receive antenna elements resulting from transmitting the signal for transmission by the plurality of transmit antenna elements.

Optionally, the plurality of transmit antenna elements and the plurality of receive antenna elements belong to an adaptive antenna array.

Optionally, each of the transmit antenna elements is coupled to a respective gain-controlled transmit amplifier, each of the receive antenna elements is coupled to a respective gain-controlled receive amplifier. The first analog processing unit is configured to adjust the gains of the gain-controlled transmit amplifiers based on the second transmit matrix. The second analog processing unit is configured to adjust the gains the gain-controlled receive amplifiers based on the first receive matrix.

Optionally, each of the transmit antenna elements is a dual polarized antenna element for transmitting a respective signal having a first polarization and transmitting a respective signal having a second polarization. Each of the receive antenna elements is a dual polarized antenna element for receiving a respective signal having a first polarization and transmitting a respective signal having a second polarization.

Optionally, the first and second polarizations of the respective transmitted signals are orthogonal, and the first and second polarizations of the respective received signals are orthogonal.

Optionally, each of the transmit antenna elements is coupled to a respective first gain-controlled transmit amplifier for amplifying the respective transmitted signals having the first polarization and is coupled to a respective second gain-controlled transmit amplifier for transmitting the respective transmitted signals having the second polarization. Each of the receive antenna elements is coupled to a respective first gain-controlled receive amplifier for amplifying the respective received signals having the first polarization and is coupled to a respective second gain-controlled receive amplifier for receiving the respective received signals having the second polarization.

Optionally, the first analog processing unit is configured to adjust the gains of each of the first and second gain-controlled transmit amplifiers based on the second transmit matrix. The second analog processing unit is configured to adjust the gains of each of the first and second gain-controlled receive amplifiers based on the first receive matrix.

Optionally, the apparatus is configured for massive multiple-input and multiple-output (MIMO) operation.

BRIEF DESCRIPTION OF THE DRAWINGS

Embodiments of the invention will be described in greater detail with reference to the accompanying drawings, in which.

DETAILED DESCRIPTION

Figure 1:
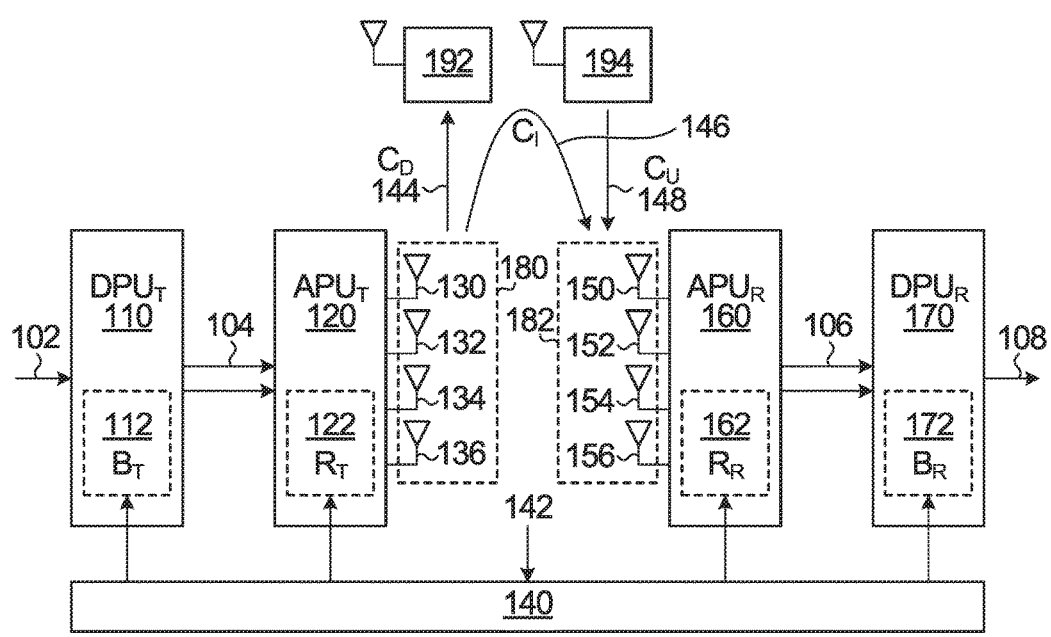
FIG. 1 is a schematic illustration of a network element in communication with user equipment devices in accordance with an embodiment of the invention.

FIG. 1 is a schematic illustration of a network element in accordance with an embodiment of the invention. The network element depicted may be part of a base station, a user equipment (UE), or another type of node, and may be stationary or mobile.

In the example illustrated, the network element has a transmit signal path that includes a transmit data stream 102 provided as input to a transmit digital processing unit ($DPU_T$) 110 configured with a first transmit matrix ($B_T$) 112. An output 104 from the $DPU_T$ 110 is provided as input to a transmit analog processing unit ($APU_T$) 120 configured with a second transmit matrix ($R_T$) 122. An output from the $APU_T$ 120 includes signals for transmission by a transmit antenna array 180 having a plurality of transmit antenna elements 130, 132, 134, 136.

The network element also has a receive signal path that includes received signals received at a receive antenna array 182 having a plurality of receive antenna elements 150, 152, 154, 156. The receive antenna is 182 provides the received signals as input to a receive analog processing unit ($APU_R$) 160 configured with a first receive matrix ($R_R$) 162. An output 106 from the $APU_R$ 160 is provided as input to a receive digital processing unit ($DPU_R$) 170 configured with a second receive matrix ($B_R$) 172. The receive digital processing unit ($DPU_R$) 170 outputs a receive data stream 108.

A controller 140 is coupled to each of the processing units 110, 120, 160, 170 for configuring the matrices 112, 122, 162, 172. Controller 140 is provided with channel state information (CSI) 142 for a wireless resource used by the network element for transmitting and/or receiving.

Although both a transmit and a receive signal path are illustrated in FIG. 1, in some embodiments a network element has only one of the transmit signal path or the receive signal path.

In some embodiments, the transmit antenna array 180 is an adaptive antenna array (AAA) where amplitude and phase coefficients of each of the transmit antenna elements 130, 132, 134, 136 are adjusted by the $APU_T$ 120. In some embodiments, the receive antenna array 182 is an AAA where amplitude and phase coefficients of each of the receive antenna elements 150, 152, 154, 156 may be adjusted by the $APU_R$ 160.

Although four transmit antenna elements 130, 132, 134, 136 and four receive antenna elements 150, 152, 154, 156 are illustrated in FIG. 1, it should be understood that this is an example, and that more generally embodiments may have more or fewer transmit and/or receive antenna elements. In some embodiments, hundreds, thousands, or more transmit and/or receive antenna elements are provided.

In some embodiments, one or both of the number of transmit antenna elements and the number of receive antenna elements are configured to be not less than a number of antenna elements of a remote user equipment (UE) in communication with the network element.

In some embodiments, such as embodiments where the network element is configured for massive MIMO transmitting operation, the number of transmit antenna elements is configured to be larger than a number of streams of data to be transmitted, and the number of receive antenna elements is configured to be larger than a number of streams of data to be received. In some embodiments, transmit antenna elements 130, 132, 134, 136 and/or receive antenna elements 150, 152, 154, 156 are dual polarized antenna elements.

In some embodiments, the processing units 110, 120, 160, 170 are digital signal processors (DSPs). In other embodiments, processing units 110, 120, 160, 170 are general purpose processors under software and/or firmware control, custom application-specific integrated circuits (ASICs), another type of processor and/or hardware logic capable of performing beamforming, precoding, and/or equalization operations, or a combination of any of the foregoing. In some embodiments, controller 140 is a general purpose processor under software and/or firmware control. Controller 140 may also have a DSP unit. In other embodiments, controller 140 is a microcontroller, custom ASIC, another type of processor capable of directing the operation of processing units 110, 120, 160, 170, or a combination of any of the foregoing. Although processing units 110, 120, 160, 170 and controller 140 are shown in FIG. 1 as being separate entities, some or all of their functionality may be provided by at least one processing unit combining the functionality of one or more of processing units 110, 120, 160, 170 and controller 140.

In some embodiments, at least some of the time, the network element transmits and receives simultaneously on a same wireless resource for full-duplex operation. In other embodiments, at least some of the time, the network element transmits and receives simultaneously on different wireless resources. In still other embodiments, the network element transmits and receives at different times for half-duplex operation, either on a same or on a different wireless resource.

Controller 140 receives CSI 142 for the wireless resource(s) used by the network element for communication. CSI 142 provides information regarding the channel state of those wireless resource(s), for example channel quality information (CQI). In some embodiments where the network element transmits and receives simultaneously on a same wireless resource for full-duplex operation, controller 140 receives common CSI 142 encoding channel state information for both transmitting and receiving on the same wireless resource. In alternative embodiments, the CSI 142 received by controller 140 includes separate CSIs encoding channel state information for each of transmitting and receiving, respectively, on the same wireless resource. In embodiments where the network element transmits and receives on different wireless resources, controller 140 receives CSI 142 encoding channel state information for each of the different wireless resources. In some embodiments, controller 140 receives CSI 142 on an ongoing basis.

CSI 142 may be based on channel quality measurements made by the network element, channel quality measurements made by UE devices in communication with the network element, and/or channel quality measurements made by other network elements. In some embodiments, CSI 142 is estimated instead of, or in addition to, being measured. CSI 142 may, for example, include complex-valued received pilot signals, a carrier level received signal strength indication (RSSI), and/or a bit error rate (BER). However, it should be understood that other means of quantifying channel state information in CSI 142, such as the use of CQIs quantifying channel quality information, are also possible. In an example embodiment where transmit antenna array 180 has N antenna elements and is communicating over a downlink channel $C_D$ 144 with UE devices 192, 194 having M total antenna elements, CSI 142 includes measured rows $c_{(i)}$, i=1, . . . , N, and measured columns $c^{(j)}$, j=1, . . . , M, of a channel matrix $\zeta_D$ representing the channel's state.

In transmitting operation of the network element, controller 140 receives CSI 142 in respect of a wireless resource to be used for transmission. Controller 140 processes the CSI to identify first time-varying characteristics and second time-varying characteristics of the wireless resource.

In some embodiments, controller 140 processes the CSI 142 to extract, as the first time-varying characteristics, channel quality characteristics of the wireless resource that vary more quickly than other channel quality characteristics of the wireless resource, and to extract, as the second time-varying characteristics, channel quality characteristics of the wireless resource that vary less quickly than the first time-varying characteristics. In some embodiments, controller 140 processes the CSI 142 to partition time-varying channel quality characteristics of the wireless resource represented by the CSI 142 into the identified first time-varying characteristics and the identified second time-varying characteristics.

For descriptive simplicity, the identified first time-varying characteristics will be referred to as fast time-varying characteristics, and the identified second time-varying characteristics will be referred to as slow time-varying characteristics.

In an example embodiment, controller 140 applies a high-pass filtering process to the CSI 142 to identify the fast time-varying characteristics and applies a low-pass filtering process to identify the slow time-varying characteristics. In another example embodiment, controller 140 applies filtering to a sequence of received CSIs to identify the fast time-varying characteristics and the slow time-varying characteristics.

In an example embodiment, controller 140 processes the CSI 142 to extract, as the fast time-varying characteristics, channel quality characteristics that change within a first time interval, and processes the CSI 142 to extract, as the slow time-varying characteristics, channel quality characteristics that change within a second time interval that begins after the first time interval. Processing the CSI 142 to extract channel quality characteristics for particular intervals can be achieved through appropriate design of high-pass and low-pass filtering processes, for example. In a first specific example, the first time interval is an interval with a length of several microseconds, that is, an interval from zero microseconds to several microseconds. The second interval is an interval from several microseconds to a particular time greater than several microseconds. Alternatively, the second interval may be an open-ended interval of time starting at several microseconds. In a second specific example, the first time interval is an interval with a length of one second, that is, an interval from zero seconds to one second. The second interval is an interval from one second to a particular time greater than one second. Alternatively, the second interval may be an open-ended interval of time starting at one second. It should however be understood that the specific intervals used are a design choice and that other ways of identifying first and second time-varying characteristics of the wireless resource are also possible.

A particular example manner of identifying the first and second time-varying characteristics of a wireless resource will now be described for an embodiment where transmit antenna array 180 has N antenna elements and is communicating over the downlink channel $C_D$ 144 with UE devices 192, 194 having M total antenna elements. CSI 142 includes measured rows $c_{(i)}$, i=1, ..., N, and measured columns $c^{(j)}$, j=1, ..., M, of a channel matrix $\zeta_D$ representing the downlink channel's state. The channel correlation can be represented by its co-variance matrix $R_{C_D}$ and can be well approximated by the Kronecker product ($\otimes$) of the covariance matrices seen from both transmitting and receiving ends. That is, $R_{C_D} = R_{C_D}^{Tx} \otimes R_{C_D}^{Rx}$ where $R_{C_D}^{Tx} = E\{([c_{(i)}]^H c_{(i)})^T\}$, $R_{C_D}^{Rx} = E\{c^{(j)}[c^{(j)}]^H\}$, $c_{(i)}$, i=1, ..., N, is the $i^{th}$ row and $c^{(j)}$, j=1, ..., M, is the $j^{th}$ column of the channel matrix $\zeta_D$. $[.]^T$ is the transpose operator, $[.]^H$ is the complex conjugate transpose operator, and $E\{.\}$ denotes the expectation, for example as computed by long-time averaging or filtering. It is well known that the channel matrix $\zeta_D = [R_{C_D}^{Rx}]^{1/2} G_D [(R_{C_D}^{Tx})^H]^{1/2}$ where $G_D$ is a stochastic N by M matrix with independent and identically distributed zero-mean, normalized-variance Gaussian-distributed random elements, and $[.]^{1/2}$ denotes the matrix square root operation, i.e., $R=[R]^{1/2}([R]^{1/2})^H$. Therefore, for a fast time-varying channel $C_D$, the channel co-variance matrix $R_{C_D}$ represents the slowly time-varying aspects of the channel, while $G_D$ represents the same fast time-varying aspects of $C_D$. Thus, to determine the fast and slowly time-varying aspects of the channel $C_D$, the controller 140 processes the CSI 142 to extract the channel co-variance matrix $R_{C_D}$ indicating the slowly time-varying aspects of the channel and to extract the matrix $G_D$ indicating fast time-varying aspects of $C_D$. It should be understood that the same manner of computation is also applicable to computing the fast and slowly time-varying aspects of the uplink channel $C_U$.

In transmitting operation, controller 140 computes and configures the first transmit matrix $B_T$ 112 of the $DPU_T$ 110 based on the fast time-varying characteristics of the wireless resource used for transmission. In some embodiments, the matrix $B_T$ is a baseband digital precoding matrix. In operation, the $DPU_T$ 110 applies $B_T$ to transmit data stream 102 to produce preceded data streams 104. In some embodiments, transmit data stream 102 includes a number of constituent data streams which may be referred to as layers. In some embodiments, the layers in transmit data stream 102 have been generated by applying scrambling, modulation mapping, and/or layer mapping to input data streams (not shown in FIG. 1). Each input data stream contains data for transmission to a particular UE. In some embodiments, the number of preceded data streams 104 is the same as, or larger than, the number of layers in transmit data stream 102.

Controller 140 also computes and configures a second transmit matrix $R_T$ 122 of the $APU_T$ based on the slow-varying characteristics of the wireless resource used for transmission. In some embodiments, the matrix $R_T$ 122 is an analog beamforming matrix. In operation, the $APU_T$ 120 applies the matrix $R_T$ 122 to precoded and/or equalized streams 104 to produce signals for transmission by the plurality of transmit antenna elements 130, 132, 134, 136. In some embodiments, transmit antenna array 180 is an adaptive antenna array, and the $APU_T$ 120 adjusts the amplitude of each transmit antenna element of the transmit antenna array 180 by adjusting the gains of transmit amplifiers coupled to each transmit antenna element based on the matrix $R_1$. In some embodiments, the $APU_T$ 120 also adjusts the phase coefficients of each transmit antenna element of the transmit antenna array 180 by adjusting the phases of transit amplifiers coupled to each transmit antenna element based on the matrix $R_T$.

In receiving operation, controller 140 computes and configures the first receive matrix $R_R$ 162 of the $APU_R$ 160 based on the slow time-varying characteristics of the wireless resource used for receiving. In some embodiments, the matrix $R_R$ 162 is an analog beamforming matrix. The $APU_R$ 160 applies matrix $R_R$ to signals received by the plurality of receive antenna elements 150, 152, 154, 156 to produce output 106. In some embodiments, the receive antenna array 182 is an adaptive antenna array, and the $APU_R$ 160 adjusts the amplitude coefficients of each receive antenna element of the receive antenna array 182 by adjusting the gains of receive amplifiers coupled to each receive antenna element based on the matrix $R_R$. In some embodiments, the $APU_R$ 160 also adjusts the phase coefficients of each receive antenna element of the receive antenna array 180 by adjusting the phases of receive amplifiers coupled to each receive antenna element based on the matrix $R_R$.

Controller 140 also computes and configures the second receive matrix $B_R$ 172 of the $DPU_R$ 172 based on the fast time-varying characteristics of the wireless resource used for receiving. In some embodiments, the matrix $B_R$ 172 is a baseband digital equalization matrix and/or a baseband digital combining matrix. In operation, the $DPU_R$ 170 applies the matrix $B_R$ 172 to output 106 of $APU_R$ 160 to produce receive data stream 108. In some embodiments, receive data stream 108 contains different constituent data streams, referred to as layers, corresponding to data received from a plurality of UEs.

An example manner in which controller 140 may compute the matrices $B_T$ 112, $R_T$ 122, $R_R$ 162, and $B_R$ 172 will be described with further reference to FIG. 1, which shows the network element previously described in communication with a plurality of UE devices 192, 194 in accordance with an embodiment of the invention. Although two UE devices 192, 194 are shown, it should be understood that the network element may be in communication with more, or fewer, UE devices.

A downlink channel $C_D$ 144 carries signals transmitted by the network element to the UE device 192. Of course, it should be understood that the downlink channel $C_D$ 144 may also carry signals transmitted by the network element to the plurality of UE devices 192, 194. An uplink channel $C_U$ 148 carries signals transmitted by the UE device 194 to the network element. Of course, it should be understood that the uplink channel $C_U$ 148 may also carry signals transmitted the plurality of UE devices 192, 194 to the network element.

In the embodiment shown, downlink channel 144 and uplink channel 148 share a same wireless resource. The use of a shared resource for transmission and reception results in self-interference between signals transmitted on the downlink by the transmit antenna array 180 and signals received on the uplink by receive antenna array 182. This self-interference can be modeled as transmitted signals from the transmit antenna array 180 being received by the receive antenna array 182 over a self-interference channel $C_I$ 146.

In transmitting operation, the network element processes data for transmission $x_d$ by applying the matrix $B_T$ 112 followed by the matrix $R_T$ 122. Thus, signals transmitted on the downlink can be represented by $R_T B_T x_d$. As explained earlier, the matrix $R_T$ 122 is configured based on slowly time-varying aspects of downlink channel $C_D$ 144, and the matrix $B_T$ 112 is configured based on fast time-varying aspects of the downlink channel $C_D$ 144.

In receiving operation, the UE 194 transmits data $x_u$, which is affected by the characteristics of the uplink channel $C_U$ 148 before being received by the network element. The network element processes received signals by applying the matrix $R_R$ 162 followed by the matrix $B_R$ 172. Thus, in the absence of self-interference, signals received by the network element on the uplink can be represented as $C_U x_u$, and the received data stream 108 can be represented as $B_R R_R C_U x_u$ plus noise. As explained earlier, the matrix $R_R$ 162 is configured to compensate for slowly time-varying aspects of the uplink channel $C_U$ 148 and the matrix $B_R$ 172 is configured to compensate for fast time-varying aspects of the uplink channel $C_U$ 148.

The self-interference signal received by the network element can be represented by $C_I R_T B_T x_d$, and the contribution of the self-interference signal to the received data stream 108 can be represented by $B_R R_R C_I R_T B_T x_d$. Self-interference channel $C_I$ is, in many cases, primarily a slowly-varying channel. In some embodiments, to remove or reduce the effects of self-interference, the controller of the network element selects the matrices $R_R$ 162 and $R_T$ 122 to minimize, to the extent possible, the effect of the term $R_R C_I R_T$ in $B_R R_R C_I R_T B_T x_d$. In some embodiments, this may involve selecting the matrices $R_R$ 162 and $R_T$ 122 so that $R_R C_I R_T$ has a power near zero, for example by minimizing the matrix norm $\|R_R C_I R_T\|^2$.

A specific technique used in an embodiment for selecting the matrices $B_T$ 112, $R_T$ 122, $R_R$ 162, and $B_R$ 172 will now be described.

First, controller 140 computes the channel co-variance matrix $R_{C_D}$, indicating the slowly time-varying aspects of downlink channel $C_D$, and computes the matrix $G_D$ indicating the fast time-varying aspects of $C_D$ as described above. Controller 140 also computes, in the same manner, the channel co-variance matrix $R_{C_U}$, indicating the slowly time-varying aspects of downlink channel $C_U$, and also computes the matrix $G_U$ indicating the fast time-varying aspects of $C_U$.

Subsequently, a numerical optimization is formulated and solved to compute, simultaneously, analog beamforming matrices $R_T$ 122 and $R_R$ 162. One dimension of each of these matrices, $R_T$ 122 and $R_R$ 162, is equivalent to the number of antenna elements used for transmitting and receiving, respectively, at the network element. The other dimension of each of these matrices corresponds to the maximum number of data streams, which is smaller than or equal to the number of antenna elements. In some MIMO embodiments, the maximum number of data streams is equal to the number of antenna elements. However, in Massive MIMO embodiments, the maximum number of data streams is typically much smaller than the number of antenna elements. The numerical optimization is performed under a constraint that matrix $R_T$ 122 permits analog beamforming to handle or compensate for the slow-varying characteristics of the wireless channel represented by $R_{C_D}$. The numerical optimization is also performed under a constraint that matrix $R_R$ 162 permits analog beamforming to handle or compensate for the slow-varying characteristics of the wireless channel represented by $R_{C_U}$. The optimization is performed with an objective function to minimize the matrix norm $\|R_R C_I R_T\|^2$, thereby cancelling at least some effects of self-interference term $C_I$. In some alternate embodiments that do not involve full-duplex operation, matrices $R_T$ 122 and $R_R$ 162 can be computed in separate optimizations that make use of a different objective functions, such as objective functions for rate maximization and/or power minimization.

Two numerical optimizations are also formulated and solved to compute, respectively, digital baseband precoding matrix $B_T$ 112 and digital precoding and/or combining matrix $B_R$ 172. The dimensions of each of these matrices, $B_T$ 112 and $B_R$ 172, correspond to the maximum number of data streams. In some MIMO embodiments, the maximum number of data streams is equal to the number of antenna elements. However, in Massive MIMO embodiments, the maximum number of data streams is typically much smaller than the number of antenna elements. The numerical optimization for matrix $B_T$ 112 is performed under a constraint that matrix $B_T$ 112 performs digital baseband precoding to handle or compensate for the fast-varying characteristics of the effective wireless channel $R_T C_D$, which are related to the fast-varying characteristics represented by $G_D$. The numerical optimization for $B_R$ 172 is performed under a constraint that matrix $B_R$ 172 performs digital precoding and/or combining to handle or compensate for the fast-varying characteristics of the effective wireless channel $R_R C_U$, which are related to the fast-varying characteristics represented by $G_U$. Each optimization is also performed with an objective function. In some embodiments, the objective function is rate maximization. In some embodiments, the objective function is power minimization. In some embodiments, the objective function may be a combination of rate maximization and power minimization.

Figure 2:
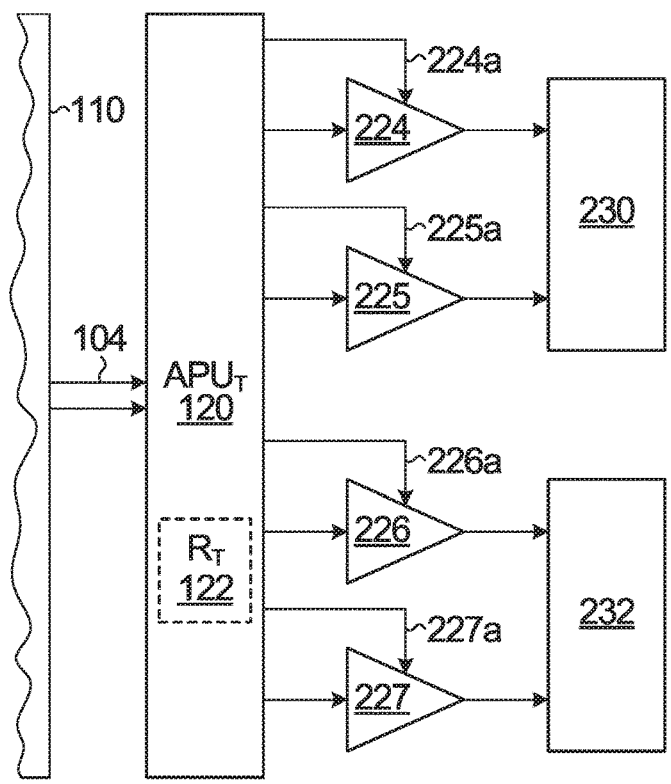
FIG. 2 is a schematic illustration of part of the transmit signal path of the network element of FIG. 1, coupled to active antennas in accordance with an embodiment of the invention.

Turning now to FIG. 2, this figure is a schematic illustration of part of the transmit signal path of another network element coupled to dual polarized active antennas in accordance with an embodiment of the invention. For illustrative simplicity, only the $APU_T$ 120 and the antenna elements to which it is coupled are shown in their entirety. A portion of $DPU_T$ 110 coupled to $APU_T$ 120 is shown in cut-away.

In the embodiment shown in FIG. 2, an output 104 from the $DPU_T$ 110 is provided as input to the $APU_T$ 120. The $APU_T$ 120 is configured with the matrix $R_T$ 122. The $APU_T$ 120 is coupled to inputs of a pair of gain controlled transmit amplifiers 224, 225 having outputs which are coupled to a dual polarized antenna element 230. The $APU_T$ 120 is also coupled to inputs of another pair of gain controlled transmit amplifiers 226, 227 having outputs which are coupled to another dual polarized antenna element 232. Control lines 224a, 225a, 226a, 227a are provided from the $APU_T$ 120 to gain-controlled transmit amplifiers 224, 225, 226, 227 respectively for adjusting the respective transmit amplifier gains. Although two dual polarized antenna elements 230, 232 are illustrated in FIG. 2, it should be understood that some embodiments have fewer or more dual polarized antenna elements.

In transmit operation, gain controlled transmit amplifiers 224, 226 amplify respective signals for transmission with a first polarization by dual polarized transmit antenna elements 230, 232. Gain controlled transmit amplifiers 225, 227 amplify respective signals for transmission with a second polarization by dual polarized antenna transmit elements 230, 232. In some embodiments, the first and second polarizations are orthogonal. The $APU_T$ 120 adjusts the gains of transmit amplifiers 224, 225, 226, 227 based on the matrix $R_T$ 122. In some embodiments, adjusting the gains of transmit amplifiers 224, 225, 226, 227 based on the matrix $R_T$ 122 is used to perform analog beamforming. In some embodiments, because the coefficients of matrix $R_T$ 122 are complex-valued, the real and imaginary parts of each coefficient of matrix $R_T$ 122 are respectively applied as real-valued gains to the two respective transmit amplifiers corresponding to each dual-polarized transmit antenna element.

Figure 3:
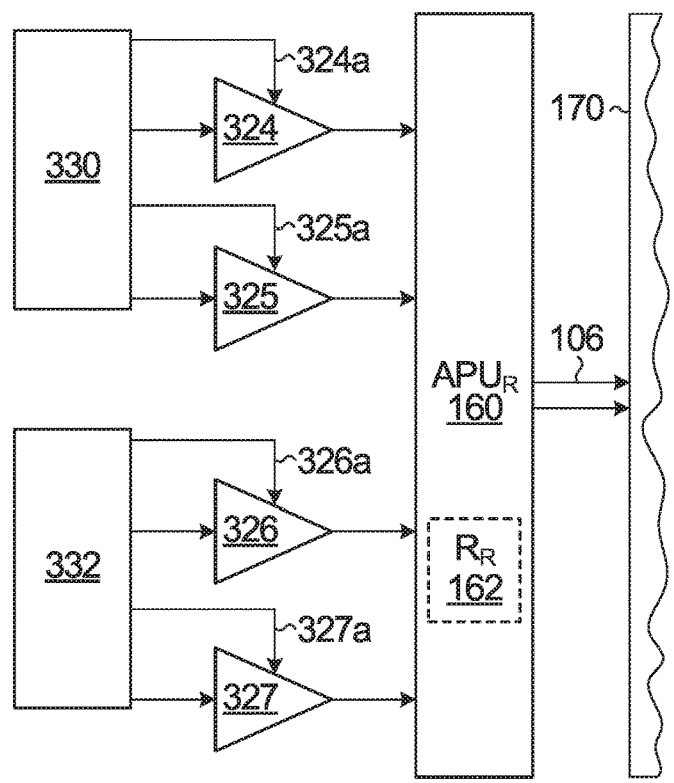
FIG. 3 is a schematic illustration of part of the receive signal path of the network element of FIG. 1, coupled to active antennas in accordance with an embodiment of the invention.

FIG. 3 is a schematic illustration of part of the receive signal path of another network element coupled to dual polarized active antennas in accordance with an embodiment of the invention. For illustrative simplicity, only the $APU_R$ 160 and the antenna elements to which it is coupled are shown in their entirety. A portion of $DPU_R$ 170 coupled to $APU_R$ 160 is shown in cut-away.

In the embodiment shown in FIG. 3, a dual polarized antenna element 330 is coupled to the inputs of a pair of gain controlled receive amplifiers 324, 325 having outputs which are coupled to the $APU_R$ 160. Another dual polarized antenna element 332 is coupled to the inputs of a pair of gain controlled receive amplifiers 326, 327 having outputs which are coupled to the $APU_R$ 160. The $APU_R$ 160 is configured with the matrix $R_R$ 152. An output 106 from the $APU_R$ 160 is provided as input to the $DPU_R$ 170. Control lines 324a, 325a. 326a, 327a are provided from the $APU_R$ 160 to gain-controlled receive amplifiers 324, 325, 326, 327 respectively for adjusting the respective receive amplifier gains. Although two dual polarized antenna elements 330, 332 are illustrated in FIG. 3, it should be understood that some embodiments have fewer or more dual polarized antenna elements.

In receive operation, gain controlled receive amplifiers 324, 326 amplify respective signals received with a first polarization by dual polarized antenna receive elements 330, 332. Gain controlled receive amplifiers 325, 327 amplify respective signals received with a second polarization by dual polarized antenna receive elements 330, 332. In some embodiments, the first and second polarizations are orthogonal. The $APU_R$ 160 adjusts the gains of receive amplifiers 324, 325, 326, 327 based on the matrix $R_R$ 162. In some embodiments, adjusting the gains of receive amplifiers 324, 325, 326, 327 based on the matrix $R_R$ 162 is used to perform analog beamforming. In some embodiments, because the coefficients of matrix $R_R$ 162 are complex-valued, the real and imaginary parts of each coefficient of matrix $R_R$ 162 are respectively applied as two real-valued gains to the two respective receive amplifiers corresponding to each dual-polarized receive antenna element.

Figure 4A:
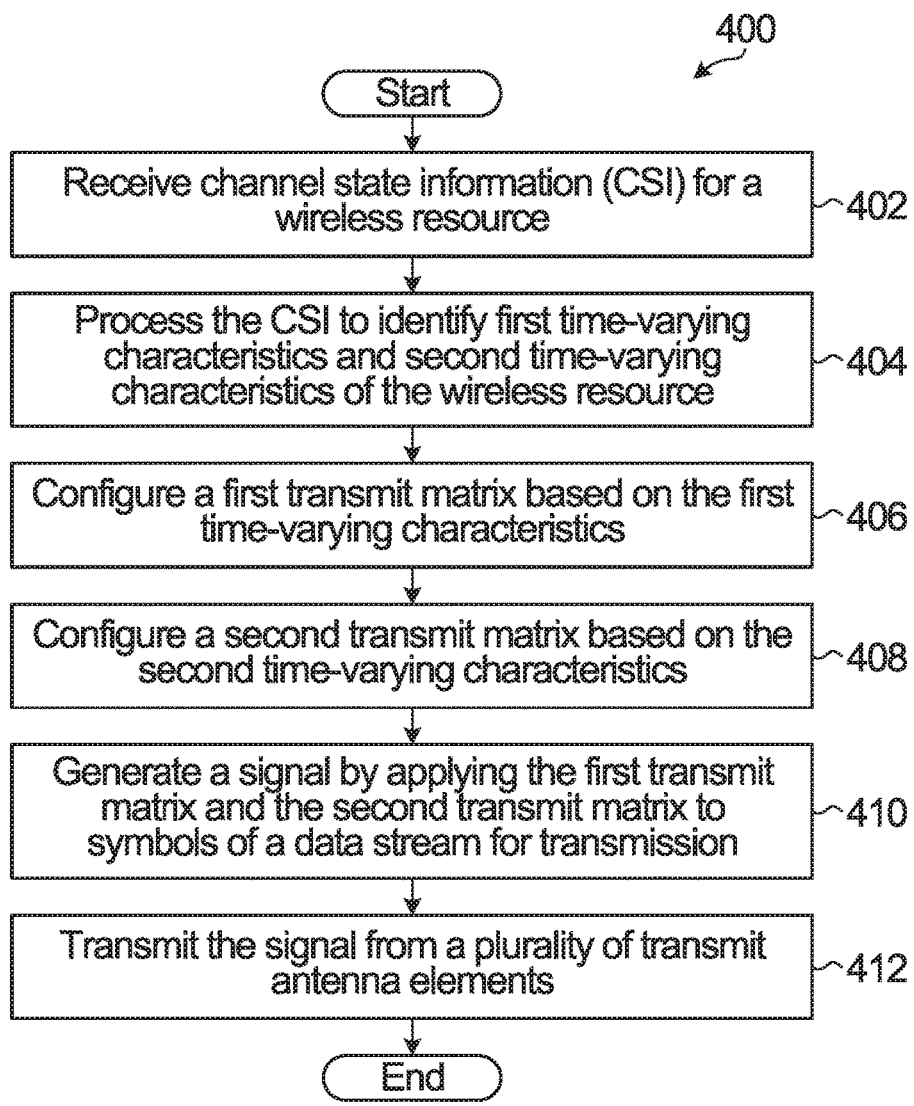
FIG. 4A is a flow diagram of a method for transmitting on a wireless resource in accordance with an embodiment of the invention.

FIG. 4A is a flow diagram of a method for transmitting on a wireless resource in accordance with an embodiment of the invention. At block 402, CSI is received for a wireless resource. In some embodiments, CSI is received for the wireless resource on an ongoing basis. The CSI is then processed at block 404 to identify first time-varying characteristics and second time-varying characteristics of the wireless resource as described earlier.

After the first and second time-varying characteristics are identified, a first transmit matrix is configured based on the first time-varying characteristics at block 406 and a second transmit matrix is configured based on the second time-varying characteristics at block 408. The first and second transmit matrices may be configured as explained above with respect to FIGS. 1 and 2. In some embodiments, the first transmit matrix is a baseband digital precoding matrix and/or a baseband digital equalization matrix. In some embodiments, the second transmit matrix is an analog beamforming matrix. The first and second transmit matrices are then applied to symbols of a data stream for transmission at block 410 to generate a signal for transmission. In some embodiments, applying the second transmit matrix involves adjusting the gains of amplifiers coupled to a plurality of transmit antenna elements. At block 412, the signal is then transmitted from the plurality of transmit antenna elements. In some embodiments, transmitting the signal involves transmitting to one or more remote UE devices. In some embodiments, the data stream for transmission includes at least two data streams for a particular remote UE device of the one or more remote UE devices.

Figure 4B:
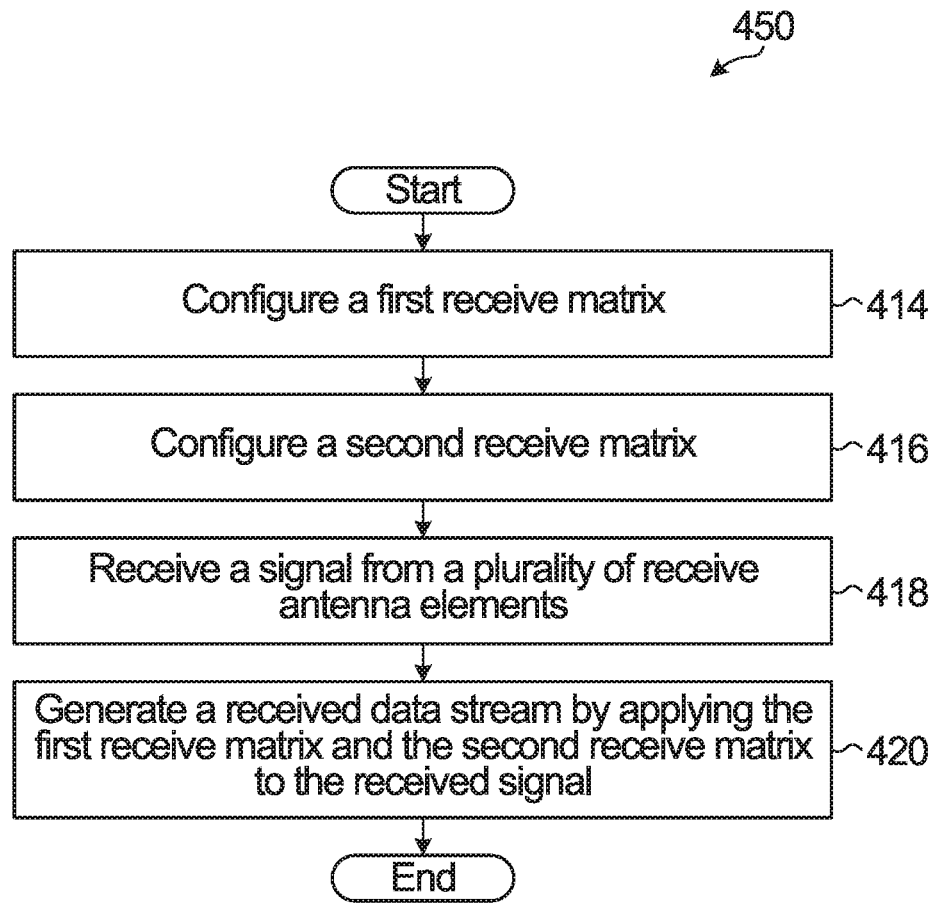
FIG. 4B is a flow diagram of a method for receiving on the same wireless resource used to transmit in the method of FIG. 4A in accordance with an embodiment of the invention.

FIG. 4B is a flow diagram of a method for receiving on a wireless resource, which may be the same wireless resource used to transmit in the method of FIG. 4A in accordance with an embodiment of the invention. In some embodiments, the same network element performs both the methods of FIG. 4A and FIG. 4B. In some embodiments, some or all of the method steps shown in FIG. 4B are performed simultaneously with some or all of the method steps shown in FIG. 4A. In a specific example embodiment, blocks 406, 408, 410, 412 of FIG. 4A are performed in parallel with blocks 414, 416, 418, 420 of FIG. 4B.

In FIG. 4B, at block 414, a first receive matrix is configured. In some embodiments, the first receive matrix is an analog beamforming matrix. In some embodiments, the first receive matrix is configured based on the second time-varying characteristics of the wireless resource identified in block 404 of FIG. 4A. At block 416, a second receive matrix is configured. In some embodiments, the second receive matrix is a baseband digital equalization/combining matrix. In some embodiments, the second receive matrix is configured based on the first time-varying characteristics of the wireless resource identified in block 404 of FIG. 4A. The first and second receive matrices may be configured as explained above with respect to FIGS. 1 and 2. For example, in some embodiments, configuring the second transmit matrix and configuring the first receive matrix involves selecting the second transmit matrix and the first receive matrix such that the product of the first receive matrix, a self-interference term, and the second transmit matrix is minimized, to the extent possible. Configuring the matrices in this manner mitigates the effects of self-interference when the method of FIG. 4A is used for transmitting at the same time the method of FIG. 4B is used for receiving.

At block 418, a signal on the wireless resource is received from a plurality of receive antenna elements. The received signal is processed by applying the first receive matrix and the second receive matrix at block 420 to generate a received data stream. In some embodiments, applying the first receive matrix involves adjusting the gains of amplifiers coupled to the plurality of received antenna elements.

In some embodiments, a non-transitory computer readable medium comprising instructions for execution by a processor may be provided to control execution of methods 400, 450 illustrated in FIGS. 4A and 4B, to implement another method described above, and/or to facilitate the implementation and/or operation of an apparatus described above. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments.

Thus, the present disclosure is not intended to be limited to the embodiments shown herein but is to be accorded the widest scope consistent with the principles and novel features disclosed herein.

What is claimed is:

1. A method comprising:
a controller of a device receiving channel state information (CSI) over a period of time that can be processed to identify distinctive time-varying characteristics for a wireless resource;
the controller processing the received CSI to identify first time-varying characteristics and second time-varying characteristics of the wireless resource based on time-dependent changes in the time-varying characteristics over at least a portion of the period of time;
the controller configuring a first transmit matrix based on the first time-varying characteristics identified by the controller;
the controller configuring a second transmit matrix based on the second time-varying characteristics identified by the controller;
the device generating a signal by applying the first transmit matrix and the second transmit matrix to symbols of a data stream for transmission; and
the device transmitting the signal from a plurality of transmit antenna elements.

2. The method of claim 1, wherein the controller processing the CSI comprises:
processing the CSI to extract, as the first time-varying characteristics, channel quality characteristics of the wireless resource that vary more quickly than other channel quality characteristics of the wireless resource, and
processing the CSI to extract, as the second time-varying characteristics, channel quality characteristics of the wireless resource that vary less quickly than the first time-varying characteristics.

3. The method of claim 2, wherein the first transmit matrix is a first baseband digital precoding matrix.

4. The method of claim 3, wherein the second transmit matrix is a first analog beamforming matrix.

5. The method of claim 4, further comprising the controller:
configuring a first receive matrix for analog beamforming;
configuring a second receive matrix for at least one of baseband digital equalization or combining;
receiving a signal from a plurality of receive antenna elements; and
generating a received data stream by applying the first receive matrix and the second receive matrix to the received signal.

6. The method of claim 5, wherein configuring the second transmit matrix and configuring the first receive matrix comprise:
selecting the second transmit matrix and the first receive matrix such that the product of the first receive matrix, a self-interference term, and the second transmit matrix is minimized,
wherein the self-interference term represents self-interference in the received signal resulting from transmitting the transmitted signal.

7. The method of claim 2, wherein the controller processing the CSI comprises performing a filtering operation to extract the channel quality characteristics of the wireless resource that vary more quickly than the other channel quality characteristics of the wireless resource.

8. The method of claim 7, wherein identifying the first time-varying characteristics and the second time-varying characteristics of the wireless resource comprises partitioning time-varying characteristics of the wireless resource into the identified first time-varying characteristics and the identified second time-varying characteristics.

9. An apparatus comprising:
a plurality of transmit antenna elements;
a controller configured to receive channel state information (CSI) over a period of time that can be processed to identify distinctive time-varying characteristics for a wireless resource;
the controller configured for processing CSI for the wireless resource, the processing comprising identifying first time-varying characteristics and second time-varying characteristics of the wireless resource based on time-dependent changes in the time-varying characteristics over at least a portion of the period of time;
a first digital processing unit coupled to the controller and configured with a first transmit matrix by the controller based on the first time-varying characteristics identified by the controller;
a first analog processing unit coupled to the controller and configured with a second transmit matrix by the controller based on the second time-varying characteristics identified by the controller;
a transmit signal path comprising the first digital processing unit and the first analog processing unit, wherein input to the transmit signal path comprises a transmit data stream and output from the transmit signal path comprises a signal for transmission by the plurality of transmit antenna elements.

10. The apparatus of claim 9, wherein the identified first time-varying characteristics consist of time-varying characteristics of the wireless resource that vary more quickly than the identified second time-varying characteristics of the wireless resource.

11. The apparatus of claim 10, wherein
the first transmit matrix is a first baseband digital precoding matrix; and
the second transmit matrix is a first analog beamforming matrix.

12. The apparatus of claim 11, further comprising:
a plurality of receive antenna elements;
a second analog processing unit coupled to the controller and configured with a first receive matrix by the controller for analog beamforming;
a second digital processing unit coupled to the controller and configured with a second receive matrix by the controller for at least one of baseband digital equalization or combining;
a receive signal path comprising the second analog processing unit and the second digital processing unit, wherein input to the receive signal path comprises a signal received by the plurality of receive antenna elements and output from the receive signal path comprises a receive data stream.

13. The apparatus of claim 12, wherein
the second transmit matrix and the first receive matrix have been selected by the controller such that the product of the first receive matrix, a self-interference term, and the second transmit matrix is minimized; and
the self-interference term represents self-interference in the signal received by the plurality of receive antenna elements resulting from transmitting the signal for transmission by the plurality of transmit antenna elements.

14. The apparatus of claim 12, wherein the plurality of transmit antenna elements and the plurality of receive antenna elements belong to an adaptive antenna array.

15. The apparatus of claim 12, wherein
each of the transmit antenna elements is coupled to a respective gain-controlled transmit amplifier;
each of the receive antenna elements is coupled to a respective gain-controlled receive amplifier;
the first analog processing unit is configured to adjust the gains of the gain-controlled transmit amplifiers based on the second transmit matrix; and
the second analog processing unit is configured to adjust the gains the gain-controlled receive amplifiers based on the first receive matrix.

16. The apparatus of claim 12, wherein
each of the transmit antenna elements is a dual polarized antenna element for transmitting a respective signal having a first polarization and transmitting a respective signal having a second polarization; and
each of the receive antenna elements is a dual polarized antenna element for receiving a respective signal having a first polarization and receiving a respective signal having a second polarization.

17. The apparatus of claim 16, wherein
the first and second polarizations of the respective transmitted signals are orthogonal; and
the first and second polarizations of the respective received signals are orthogonal.

18. The apparatus of claim 16, wherein
each of the transmit antenna elements is coupled to a respective first gain-controlled transmit amplifier for amplifying the respective transmitted signals having the first polarization and is coupled to a respective second gain-controlled transmit amplifier for transmitting the respective transmitted signals having the second polarization, and
each of the receive antenna elements is coupled to a respective first gain-controlled receive amplifier for amplifying the respective received signals having the first polarization and is coupled to a respective second gain-controlled receive amplifier for receiving the respective received signals having the second polarization.

19. The apparatus of claim 18, wherein
the first analog processing unit is configured to adjust the gains of each of the first and second gain-controlled transmit amplifiers based on the second transmit matrix; and
the second analog processing unit is configured to adjust the gains of each of the first and second gain-controlled receive amplifiers based on the first receive matrix.

20. The apparatus of claim 9, wherein the apparatus is configured for massive multiple-input and multiple-output (MIMO) operation.

\* \* \* \* \*